United States Patent [19]

Hodgdon, Jr. et al.

[11] 3,787,339

[45] Jan. 22, 1974

[54] PROCESS FOR DEFOULING ANION EXCHANGE RESINS WITH CHLORINE DIOXIDE

[75] Inventors: Russell B. Hodgdon, Jr., Sudbury; Edward T. Roach, Arlington, both of Mass.

[73] Assignee: Ionics, Incorporated, Watertown, Mass.

[22] Filed: Sept. 7, 1972

[21] Appl. No.: 286,849

[52] U.S. Cl. ............... 260/2.1 R, 210/32, 260/2.1 E
[51] Int. Cl. .......................... B01d 15/06, C02b 1/76
[58] Field of Search .................................. 260/2.1 R

[56] References Cited
UNITED STATES PATENTS 3,078,224  2/1963  Schulze et al. ......................... 210/30
3,123,553  3/1964  Abrams ................................... 210/30

OTHER PUBLICATIONS

Abrams et al., Ind. Eng. Chem. 51, 1043–1044 (1959).

Primary Examiner—Melvin Goldstein
Attorney, Agent, or Firm—Norman E. Saliba et al.

[57] ABSTRACT

A process for treating fouled anion exchange resins with a stabilized chlorine dioxide solution for the purpose of regenerating the same for reuse. The process is especially useful for treating anion exchange membranes which have become fouled when employed in the electrodialysis of solutions containing large organic molecules.

9 Claims, No Drawings

PROCESS FOR DEFOULING ANION EXCHANGE RESINS WITH CHLORINE DIOXIDE

This invention relates to a non damaging but active treatment for removing anionic and polyanionic organic foulants from both fouled anion exchange resin beads and anion exchange resin membranes. More particularly, the invention is directed to the regeneration of the conventional "gel" type, microporous anion selective membranes which have become fouled during the electrodialysis of solutions containing large organic or inorganic molecules. Specifically, this invention is directed to the use of stabilized chlorine dioxide ($ClO_2$) to reclaim fouled or spent anion exchange membranes which will be more fully disclosed hereinafter. While the following disclosure is more importantly directed to the removal of anionic and polyanionic organic foulants from anion exchange resin membranes, it will be understood that the same principles are generally applicable to the reclaiming of spent (fouled) anion exchange resin beads or granules.

The electrodialysis of aqueous solutions (especially those containing organic vegtable matter such as surface waters, sewage material, sugars, pharmaceuticals etc.) frequently suffer from membrane fouling which is especially noticeable with the strongly basic types of anion selective membranes which contain ion-exchange groups of quarternary ammonium, quarternary phosphonium, tertiary sulphonium, etc. Fouling however is still a problem with most present day anion exchange membranes even those made with resins containing weakly basic groups although not to the same extent.

These fouling substances (present in the solution being electrodialyzed) are evidenced during operation by a considerable increase in the resistance (voltage) of the membrane demineralizer over a period of time. This increase in electrical resistance is believed due to the precipitation, clogging and/or imbedding of the membrane surface by medium and large molecular weight organic compounds and/or insoluble salts which originate from the solution being electrodialyzed. Fouling of membranes is encountered for example especially in the electrodialysis of industrial solutions such as sugar solutions, red wine, whey etc. which contain substantial amounts of the offending material. The fouling material becomes lodged or formed in situ within the membranes or will tenaciously cling to their surfaces thus building up a dielectric layer. Electric membrane demineralizers of the type employing ion-exchange membranes are well known in the art and are fully described in the U.S. Pat. Nos. 2,708,658, 2,826,544, 2,848,403, 3,239,442, 3,341,441 and many others.

Both ion exchange resins of the anionic type and ion exchange membranes of the anionic type have had a particular field usage problem known as irreversible polyanion fouling which has had an adverse effect on the desalting of brackish waters by both unit operations known as ion exchange and electrodialysis.

These adverse effects include a general decay of both the anion exchange resins in ion exchange practices and the anion exchange membranes in the electrodialysis practices.

Several prior methods of alleviating membrane fouling have been attempted with only minor degrees of success. These methods include the addition of acid to the solution to be treated, pretreatment of the solution for removal of the offending molecular or polyvalent ions as by clarification or defecation by use of charcoal, carbon, etc. or the periodic or cyclic reversal of the direct current employed during operation of the electrodialysis apparatus. Other methods involve treating with chemicals such as acids, bases, salts etc. or sanding or wire brushing the surfaces of the membranes to remove the fouled outside layer. These latter methods of treating the membranes directly have not been too successful although the sanding process will recover them for further use for very short periods of time. However, fouling will again reoccur wherein a repeat sanding of the membranes is again required. Eventually however the membranes are not recoverable and must be replaced a great expense.

It has now been found that the recovery for further usage of the spent anion exchange membranes (and anion exchange resin granules) can be successfully effected by a simple but effective oxidation process which is noted to preferentially destroy foulants at the surfaces of both anion resin species (membranes and granules) but which fails to destroy the anion exchange resin polymers, or even more important, the functional groups such as the quarternary ammonium group which is appended to the polymer structure. This oxidation has been found to be unique and especially effective with stabilized chlorine dioxide. It is especially noted that other strong oxidants such as hypochlorite, permanganate, ozone, and concentrated nitric acid were found not very effective and oftened resulted in irreversible oxidative damage to the ion exchange groups of the anion resins and often appreciable damage to the polymeric structure itself.

This singular destruction of the foulant material attached to anion exchange resin structures without the concurrent destruction of the resin itself resulted in the means of extending the useful lives of both anion exchange resin beads in the unit operation called ion exchange and the anion exchange membrane in electrodialysis operations. The result is sharply longer membrane and resin lives, with shorter shakedown times, or replacement times in each operation. It is also a major advantage in the qost reduction factor in water purification treatments and furthermore allows both systems to be used in the treatment of sewage, food and ehcmical solutions, in addition to the very important drug purification industry. It is therefore a primary object of this invention to reclaim fouled ion exchange resins, of both the membrane and particulate form for greatly extended periods of time by treating said fouled resins with chlorine dioxide ($ClO_2$) as the specific defouling agent.

It is a further object of this invention to employ a form of stabilized chlorine dioxide ($ClO_2$) which has been rendered water soluble and non-explosive, to oxidize and thus destroy the foulant coatings on anion exchange resin without causing substantial adverse effects to either the resistnace, exchange capacity, or physical strength of the resin substrate.

Many other objects and advantages, such as economy and efficiency of use, time savings due to less frequent shut downs, etc. will be apparent from the following description of this invention.

Stabilized aqueous chlorine dioxide ($ClO_2$), per se, is a product known under the registered trade mark "Anthium Dioxcide" available from International Dioxcide, Inc., New York, N. Y. The usual commercial product is a water clear liquid of a pH of 8 and containing 5% by weight of $ClO_2$ (50,000 ppm). U.S. Pat. Nos. 3,123,521 and 3,082,146 disclose the product, its preparation and the use of the strong oxidizing power of stabilized chlorine dioxide ($ClO_2$). A further type of stabilized aqueous solution of chlorine dioxide and the process of making the same are additionally disclosed in U. S. Pat. No. 3,585,147.

It has been discovered that such a form of chlorine dioxide ($ClO_2$) which has been stabilized and rendered water soluble and non explosive by direct combination of the same with approximately equimolar parts of both hydrogen peroxide and alkali carbonate (such as for example sodium carbonate) in an aqueous solution of the desired concentration such as for example about 5% concentration (based upon the weight of available $ClO_2$) is effective to almost totally oxidize the foulant coatings on anion exchange membranes and anion exchange beads. It was further found that practically little if any damage was caused by the $ClO_2$ treatment either with respect to the resistance, exchange capacity, or physical strength of the polymeric resin substrate. This was a most surprising and unexpected result since the use of other known oxidants applied to fouled membranes produced substantially negative results along with membrane damage. This result has been heretofor long sought but unattainable in the ion exchange industry. The following examples will, it is believed, fully describe and present in more detail the present invention.

EXAMPLE 1

An anion exchange resin Dowex 1 × 4 (20–50 mesh) having a static ion exchange capacity of 3.78 milliequivalents per dry gram of resin (meq./dgr.) was placed in a neutral solution containing excess sodium humate for 3 days. (This material is known to foul ion exchange resins). After rinsing, the resin was found on analysis to have suffered a strong base capacity loss of 0.29 milliequivalents per dry gram of resin which is a 7.7% loss and indicative of resin fouling. This fouled resin was washed overnight in about 5% by weight of stabilized $ClO_2$, water rinsed, acidified with about 2N HCl solution, rewashed in water, re-exchanged with a 2N solution of sodium chloride and then washed with water to remove free chloride ions. Exchange of the chloride form resin with excess 2N $NaNO_3$ and titration of eluted chloride ions gave a capacity of 3.82 meq./dry gram of resin. This resin was completely recovered capacity-wise. The resin beads were hard and had undergone no splitting as determined by microscopic examination.

A fouled sample of the above resin was given a 24 hour rinse in 2N HCl and then in 2N NaCl. This treatment however failed to recover the capacity lost to the humate ions, and it was found necessary to employ the chlorine dioxide treatment to recover the resin for further use.

EXAMPLE 2

Anion exchange membranes, which originally had area resistivities of 18.0 to 19.0 ohm-cm² when measured after equilibration in 0.01N NaCl were used in a commercial electrodialysis process to remove dissolved minerals from red grape wines. After a short operational period the active area (liquid flow path area) of these anion membranes had become brown in color and had increased in resistivity to a range of 43.0 to 55.0 ohm-cm². All attempts to recover the membrane by caustic washing, acid washing or combinations of caustic, acid and brine washing did not significantly lower the measured resistivity value at the 0.01N NaCl benchwork measurement. Additionally, attempts to clean the stained (brown) active membrane area with the powerful oxidant, sodium hypochlorite (5% by weight of NaOCl), led to loss of resin ionization as measured by a resistivity increase to 70–76 ohm-cm² and severe physical weakening of the Dynel (T.M) cloth reinforcing material employed to back up or support the membrane. Sample strips of the above described fouled membrane were placed in the following solutions of the hereinbefore described stabilized chlorine dioxide.

a. 5% $ClO_2$ 17 hrs. soak time.
b. 5% $ClO_2$ 41 hrs. soak time followed by 2N NaCl — 24 hrs. soak time.
c. 5% $ClO_2$ 17 hrs. soak time followed by 2N NaCl — 24 hrs. soak time.
d. 5.0% $ClO_2$ 65 hrs. soak time followed by 2N NaCl — 24 hrs. soak time.
e. 2.5% $ClO_2$ 65 hrs. soak time followed by 2N NaCl — 24 hrs. soak time.
f. 2.5% $ClO_2$ 41 hrs. soak time followed by 2N NaCl — 24 hrs. soak time.

| Test Case | Membrane Resistivity in ohm-cm² after equilibration in 0.01N NaCl | Remarks |
|---|---|---|
| (a) | 24.0 ohm-cm² | no loss of strength, good color removal |
| (b) | 20.8 ohm-cm² | no loss of strength, total color removal |
| (c) | 22.1 ohm-cm² | no loss of strength, good color removal |
| (d) | 23.4 ohm-cm² | no loss of strength, good color removal |
| (e) | 30.9 ohm-cm² | no loss of strength, good color removal |
| (f) | 29.6 ohm-cm² | no loss of strength, good color removal |

All treatments above were quite effective in removing foulants with the strength of the $ClO_2$ (at 5%) being more effective than the 2.5% strength even when employed without the sodium chloride post treatment. The use of the sodium chloride post treatment does however appear to enhance the effectiveness of the chlorine dioxide treatment. This greater effectiveness will result where the post treatment employs a chloride salt selected from the group consisting of alkaline metal chloride, alkaline earth metal chloride and mixtures thereof.

EXAMPLE 3

Anion exchange membranes made in accordance with U.S. Pat. No. 2,800,445 and wyich originally had area resistivities of 18.0 to 19.0 ohm-cm² were measured for area resistivity after equilibration in 0.01N NaCl. These membranes after having been employed in the electrodialysis of a corn syrup solution measured 45–50 ohm-cm² and had staining on the flow paths area of a dark brown coloration. The membranes (9 inches × 10 inches × 0.023 inches) were immersed in a 5% solution of stabilized chlorine dioxide for a period of 17 hrs., removed and allowed to rinse in water for a period of 30 minutes. The membranes were then transferred into a tub of 2N NaCl which resulted in a yellow-greenish gas (probably chlorine dioxide) being given off. The brown coloration was immediately removed from the membranes. These membranes were soaked in distilled water to remove all acid traces, immersed for 30 minutes in a tub of 2N NaCl and finally rinsed to remove free chloride ion. The membranes were than equilibrated in 0.01N NaCl for 15 minutes and their collective resistivities measured. The resistivities averaged 20.5 ohm-cm$^2$. The use of a post acidification treatment was found to improve the effectiveness of the stabilized chlorine dioxide treatment. The acidification should be to a pH of less than 6 followed preferably by treatment in an aqueous chloride salt solution.

Additional corn syrup fouled membranes having resistivities of between 45–50 ohm-cm$^2$ were treated using three different standard type recovery treatments, all of which were not too successful in removing color or lowering the membrane resistance. The standard methods employed and the resulting resistivities were as follows:

a. Treatment in 2N HCl, then NH$_4$OH followed by conversion to the chloride form, a resulting resistivity = 32.3 ohm-cm$^2$.

b. Treatment in 2N NaCl (sodium chloride), resistivity = 40.2 ohm-cm$^2$.

c. Treatment in a solution of 2N NaCl—5% NaOCl (by weight), resistivity = 51.5 ohm-cm$^2$.

EXAMPLE 4

An anion exchange membrane which originally had an area resistivity of 18.7 ohm-cm$^2$ and an ion exchange capacity (IEC) of 2.26 milliequivalents per dry gram of resin (meg./dgr.) was immersed overnight in a 2% solution of sodium dodecyl sulfate, a notoriously bad foulant. After rinsing, the said membrane had the following properties:

IEC (as Cl$^-$) = 0.36 meg./dgr.
Resistivity = 775 ohm-cm$^2$

The membrane was placed for 47 hours in 5% stabilized ClO$_2$ and then rinsed for 15 minutes in 2N HCl (greenish gas evolved) then with distilled water, then with 2N NaCl for 15 minutes followed by exhaustive rinsing and final equilibration with 0.01N NaCl. The physical properties remained unchanged and the resistivity had dropped to 42.5 ohm-cm$^2$. This is the first instant of ever being able to recover such a membrane which had been totally fouled with sodium dodecyl sulfate.

It will be apparent from the disclosure and measured results obtained in the detailed examples above that the use of stabilized chlorine dioxide (with or without the use of an acid or chloride salt post treatment step) is extremely effective to regenerate the desired properties of low resistivity, high capacity and to remain intact the physical strength of ion exchange resin (membranes and beads) that were fouled in systems using the same.

The embodiments of the invention in which an exclusive property or privilege is claimed are defined as follows:

1. The process of regenerating fouled anion exchange resin comprising contacting said fouled resin with an aqueous solution of stabilized chlorine dioxide for a period of time sufficient to regenerate the same.

2. The process of claim 1 wherein the period of contact time of the fouled resins is at least about 17 hours.

3. The process of claim 1 wherein the fouled ion exchange resin material is in a sheet or membrane form and the stabilized chlorine dioxide employed comprises a concentration of approximately 2.5 to 5 percent by weight of chlorine dioxide.

4. The process of claim 3 wherein the anion membrane after being contacted with said stabilized chlorine dioxide is further treated by acidification.

5. The process of claim 4 wherein the acidification is by contact with hydrochloric acid solution.

6. The process of claim 3 wherein the membrane after being contacted with stabilized chlorine dioxide is further treated with an aqueous solution of an alkali metal chloride salt.

7. The process of claim 6 wherein the salt is sodium chloride.

8. The process of regenerating fouled anion exchange resin comprising treating said fouled resin with an aqueous solution of chlorine dioxide, then treating with an aqueous solution of an acid and thereafter further treating the said resin with an aqueous solution of an alkali metal chloride.

9. The process of claim 8 wherein the acid is hydrochloric acid and the alkali metal chloride is sodium chloride.

* * * * *